Oct. 12, 1948. M. R. MULLEN 2,451,171
OLEO STRUT FOR AIRPLANE LANDING GEARS
Filed Dec. 14, 1942 2 Sheets-Sheet 1
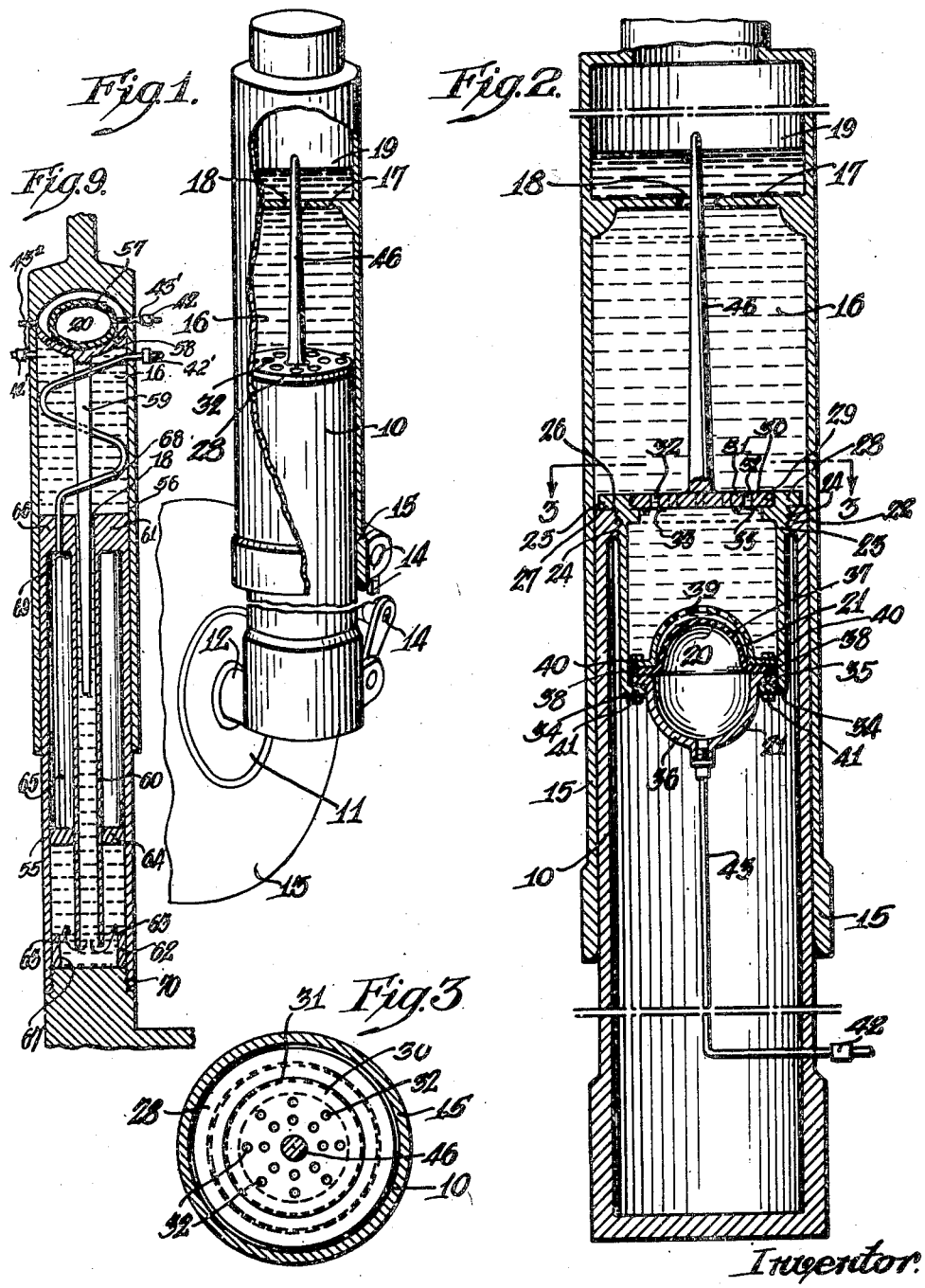
Inventor:
Milton R. Mullen Oct. 12, 1948. M. R. MULLEN 2,451,171
OLEO STRUT FOR AIRPLANE LANDING GEARS
Filed Dec. 14, 1942 2 Sheets-Sheet 2
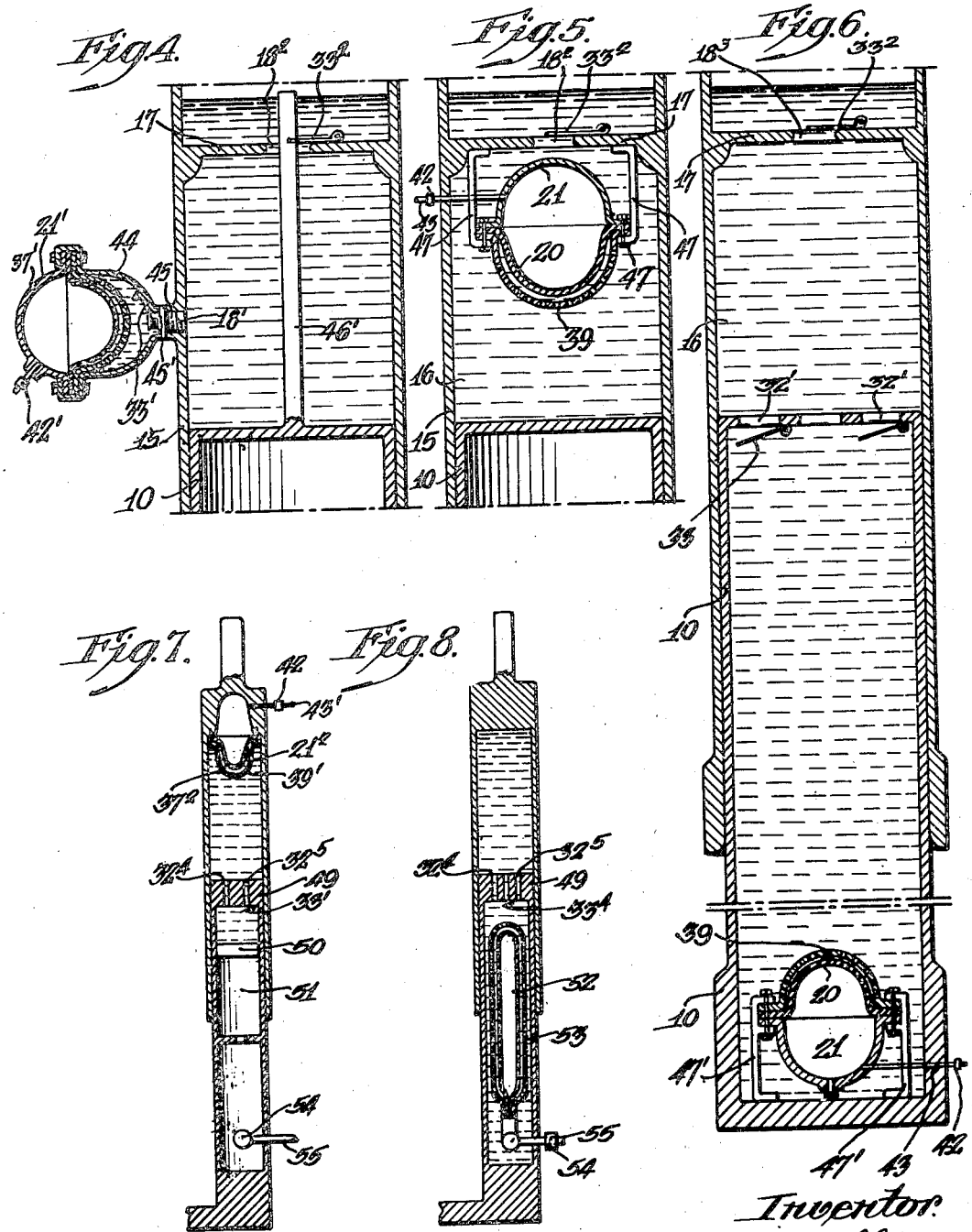
Inventor:
Milton R. Mullen Patented Oct. 12, 1948

2,451,171

UNITED STATES PATENT OFFICE 2,451,171

OLEO STRUT FOR AIRPLANE LANDING GEARS

Milton R. Mullen, Philadelphia, Pa., assignor of one-fourth to Wm. Steell Jackson and Joseph Gray Jackson Application December 14, 1942, Serial No. 468,942

3 Claims. (Cl. 267—64)

My invention relates to the struts of landing gears used by airplanes.

One purpose of my invention is to afford a softer entry into the easement curve and to smooth out the ripples in the take off and in the easement curve in landing, which ripples are caused by unevenness in ground surface.

A main purpose is to provide a strut cushion offering the general character of protection which the wheel tire compression offers but capable of very much more extended benefit than can be secured by the tire compression.

A further purpose is to present a strut cushion comparable in its action with that of a tire (except that it is snubbed on the rebound) but capable of larger proportionate compression and hence of graduated pressures over a much wider pressure range than can be secured in the tire. It might be compared with a spring snubbed on the rebound and "in series" with the tire. If the existing throttled liquid action be compared with spring action the comparison would have to be qualified by the criticism that its action is snubbed in both directions. This causes their action, particularly during taxiing, to be compared with the unsprung action of a flat tire.

A further purpose is to provide an oleo leg with a standard restricted oil flow through a throttling passage whether uniform or progressively changed and to cushion the initial pressure by hydropneumatic means operating on the pressure side of a cushioning bulkhead.

A further purpose is to use the oil of an oleo leg for a double purpose, by throttled discharge against an air cushion, and coincidently by unrestricted flow as the hydraulic element of an hydraulic accumulator.

A further purpose is to soften the initial shock which takes place when sections of a landing strut telescope against an air cushion and subsequently use it to absorb the local shocks from travel over rough ground.

A further purpose is to interpose an air cushion comparable to a tire, but in range and variation in pressure superior to a tire, in series between the existing landing gear tire and the throttled oil discharge and air compression of existing collapsible-leg oleo struts.

Further purposes will appear in the specifications and in the claims.

My invention relates to a method or process of cushioning and also to a mechanism by which the method or process may be carried out.

I have preferred to illustrate the invention by a few forms only, selecting forms which are practical, effective and reliable and which at the same time well illustrate the principles of the invention.

Figure 1 is a perspective view partly broken away to show the interior of one form of strut with which my invention may be used.

Figure 2 is a fragmentary longitudinal section of Figure 1 through the telescopic members.

Figure 3 is a section of Figure 2 upon line 3—3.

Figures 4, 5, 6, 7, 8 and 9 are fragmentary longitudinal sections of various forms.

In the drawings similar numerals indicate like parts.

In almost all landing gears the first shock of impact with the ground is taken by large tires at the lower ends of hollow oleo struts. The tires flatten to varying degrees but do not change much in resisting internal pressure because the volumes of the flattened portions are small as compared with the total volumes within the tires.

In series, as it were, with the tires—because it cannot start until after the tires receive the shock and begin to transmit this shock—occurs a telescoping of hollow oleo strut members by which liquid (preferably oil) in one of these members is driven through a restricted opening in what is effective as a bulkhead within another chamber, such as the bulkhead in the other member.

The opening may be further restricted on rebound in any of the ways shown in later figures. The liquid progressively compresses, and increases the pressure of, air trapped in the other member (chamber), permitting continued telescoping of the hollow members and corresponding movement of the body of the plane toward the wheel. The movement of the wheel with respect to the body takes place as fast as liquid from the high pressure (under) side of the bulkhead passes through the orifice or orifices in the bulkhead against the air resistance.

At the same time that liquid is being forced through a throttling opening to compress air in a space, shown at the top of the strut in Figures 1 and 2, the same liquid under pressure is used as the hydraulic part of an hydraulic accumulator whose air compartment, within an enveloping cover, lies within or in communication with the oil on the high pressure side of the opening. The liquid has free access to the air compartment when compression of air is taking place and may or may not have free release to join the main high pressure body of the liquid when the air is expanding.

Initial pressure may be provided in the air compartment of the accumulator, up to hundreds of pounds, so as not to have further compression of the air in the air compartment take place until this initial pressure has been exceeded. This is a matter of design.

The oleo leg shown is based upon a tire-supported lower telescopic member and an upper telescopic member with liquid carried by the upper member and compressed air in the upper part of the upper telescopic member, there being retardation in the liquid flow and hence also in the air compression due to throttling of the liquid in passage into the upper member.

Because the usual form of existing telescopic legs using liquid which is obstructed in passage into an air space provides, and in my opinion the best form provides a lower telescopic member of the telescopic pair as the interior one of the pair, and it thus becomes in effect a lower piston or plunger within an upper cylinder, I shall so consider them, with the thought, however, that a reversal in so common a feature will not alter the cooperative effect, nor will it alter the benefit of my invention in connection with any such construction.

Within the body of liquid on the high pressure side of the throttling point, that is, the body of liquid immediately engaged by the plunger to develop high liquid pressure, or in communication with this liquid, I supply what I will call a collapsible air cell which may be in the form of a bulb or other segregated container or space which acts as the air cell of an hydraulic accumulator. The high pressure liquid is the liquid of this accumulator and has access freely to the movable (collapsible) wall of the cell to compress it quickly, but there may be either quick or retarded release of this liquid to permit quick, or to provide slower, expansion of the movable wall of such a unit.

The term "hydraulic accumulator" has another meaning in the art and is used sometimes when the air cell only of the combination is intended, either use of the term being permissible provided the context indicate the sense in which the term is used.

The piston or plunger 10 of one of what are usually duplicate oleo legs carries a landing wheel 11 upon an axle 12. Suitable bearings not shown are provided. Upon the wheel is mounted a large pneumatic tire 13 whose compression offers the first yielding impact against the ground when an airplane lands.

In order that the piston may not rotate with respect to the cylinder and may be prevented from expulsion from the cylinder, any suitable type of torsion links is used, of which fragmentary portions are shown in the illustration at 14. These are well known in this art.

In Figure 2 the lower section, piston 10, telescopes within cylinder 15 which normally carries the bulk of the liquid 16.

At or near the normal upper liquid level when the plane is in the air, is located a bulkhead 17 which is perforated at one or more points 18 to allow throttled passage of liquid through the bulkhead into the air space 19 above the bulkhead. Within this space the liquid acts as a liquid piston to compress air as and when the liquid passes upwardly through the bulkhead. The throttling thus produced retards the rate at which the liquid yields to pressure upon it as the impact or weight of the airplane during or after landing reacts through the tire. Correspondingly it retards the rate at which the parts telescope. The liquid flow is further reduced by the fact that progressive compression of the air in this upper air space builds up an opposing air pressure, usually starting from pressure equivalent to the tire pressure, in the ratio of their respective cross-sectional areas.

The piston in Figure 2 at any suitable point supports the collapsible air bulb 20 of an air cell unit 21 which cooperates with the liquid on the high pressure side of the bulkhead and is compressed by it. The air cell and liquid under pressure having access to the air cell together form an hydraulic accumulator which may or may not be under initial air pressure, as preferred.

For convenience in support of the air cell unit, I show in Figure 2 one form of construction by which the piston may be used for that purpose without interfering with an otherwise normal type of piston. It is recognized as one form only of many permissible supports and is given in illustration and not in limitation.

In order to avoid need of the large volume of liquid which would be necessary if the (lower) plunger were filled with liquid as in Figure 6, a false bottom, as it were, is built into the piston or plunger member, in Figure 2. It carries the air cell unit in a bracket which at the same time forms a liquid tight bottom for the liquid space.

The upper end of the piston is hollow and is interiorly flanged at 22 and threaded to receive a barrel 23 which is threaded exteriorly at 24 to engage the interior threads. It is exteriorly flanged at 25 at the top and is faced at 26 to seal against the faced end 27 of the outer (end) piston wall.

The barrel is interiorly flanged at 28 at the top and threaded at 29 to receive a head 30 which may take the form of a threaded disc 31.

The disc 31 is apertured at 32 to allow liquid to pass downwardly freely through the disc. When it is desired to throttle upward liquid flow through the disc some of these apertures are closed against return liquid flow by flap valves 33 which do not interfere with downward flow.

Whether flap valves be used or not there is free flow in one direction, not only through the apertures without flaps but through these with flaps having restricted flow in the reverse (rebound) direction.

The free flow of liquid through the apertures 32—one way, and with restricted flow in the reverse direction, illustrated in Figure 2 as accomplished by flap valves—produces a snubbing effect on the rebound offering a benefit somewhat comparable with that of snubbed springs in automobile use. The compression and expansion of air in the upper part of the cylinder is incapable of this differential action, relatively snubbing in one direction, because it does not have free liquid movement in either direction, the liquid being throttled not only during liquid flow which compresses the air but in liquid flow as a result of expansion of the air.

The lower part of the barrel 23 is interiorly flanged at 34 and the flange is upwardly faced to receive and hydraulically seal against the under face of flange 35 of a bowl 36, forming the lower limiting container wall of the air cell unit 21.

The bowl 36 is rigid but is capped by a flexible bulb-like cover 37, flanged at 38. Above the cap bulb is a grid 39 which allows access of liquid to the bulb freely through apertures too small for parts of the bulb to be forced out through them. The grid is flanged at 40 and bolts 41 pass through the lower barrel flange, bowl flange, bulb flange and grid flange, with any ring washers desired, not only to hold these parts together but to seal against leakage of liquid through the barrel or into the interior air space of the air unit formed. The grid protection permits preliminary air pressures to be established through check valve 42 and pipe 43.

The cover or bulb 37 is a flexible—and permissibly elastic—diaphragm of the air cell and is free to collapse within the bowl 36 with corresponding compression of the air within the cover and bowl. The chief objection to stretchability in this cover (diaphragm) is the higher rate of deterioration and lower strength of an elastic or resilient diaphragm.

Whether elasticity be desirable depends somewhat upon the conditions of extent of pressure to be met, the exposure to contaminating influence and the balance of possible gain from the stretching of the diaphragm as against shortening of the life. These must be appraised and determined with regard to the intended use and are, therefore, viewed by me as items of design. The structure is entirely operative with a flexible cup. Resilience and elasticity are pointed out merely as offering advantages to be considered as for possible additional benefits, against known objections.

The grid is so shaped that initial air pressure within the bulb will push the bulb out against the grid where it receives full support from the grid but without straining the bulb and, unless it be the intention to use a resiliently stretchable bulb such as a rubber or rubber-like product, without stretching the bulb material.

It is also the intention that the bowl and bulb shall bear such size and shape relation that within the limits of maximum pressure contemplated, the cup forming the bulb will not be forced down into the bowl far enough injuriously to distend the material of the bulb, planning to flex this material rather than to stretch it, unless the pressures used and other conditions of use permit and the design provide a rubber or rubber-like or otherwise stretchable material.

The proportions of the piston, cylinder liquid content and the two air space volumes are such that the piston cannot at any time strike the bulkhead because of the high air pressure which is developed, and the bulk of air in the two air reservoirs.

The liquid content fills the barrel about the air cell, the cylinder above the piston and varying parts of the air-containing cushion space above the bulkhead. The pressure of the liquid presses both ways at the same time (actually in all directions, of course), tending to compress the air in each of the two air cushions provided.

Each of the air cushions, when compressed offers resilient reaction to maintain pressure of liquid upon the other. It is to be noted, however, that as to each of these cushions if given an initial pressure, it does not yield further to pressure until a pressure of liquid is reached which exceeds the initial pressure in that cushion.

It will be noted that in Figure 2 a metering pin 46 carried by the piston progressively reduces the size of the opening 18 as the piston and cylinder telescope. This movement forces liquid through the perforation. This pin makes the effective section of an orifice an annulus of variable area. In Figure 4 the pin 46' is of uniform thickness, used for the purpose chiefly of making the orifice an annulus, but in this case of uniform cross-sectional area.

In Figures 5 and 6 no pin is used and the aperture is uninterrupted in cross section.

Access of the liquid to the bulb does not require that the air cell or bulb be actually within the leg, much less that it be within the piston or plunger. For example the air cell 21' (Figure 4) may be within a shell 44 wholly outside of the telescopic parts of the leg but hydraulically connected with the cylinder by a conduit 45 from a point below the bulkhead, as seen in Figure 4. The unit in Figure 4 may contain the same types of bowl, bulb, grid, etc., as are used in Figure 2.

Obviously either the upper or lower of the telescopic parts may support or contain the cell of Figure 4. Neither need actually house it.

It will be evident that the shell 44 may serve the purpose of, and occupy the place of the grid 39 in Figure 4 provided it be in position so that the cup or cover 37' will engage the shell—as it would engage the grid—with full movement toward the right in Figure 4 and with what has been determined to be permissible or desirable stretch if this be intended. The conduit in Figure 4 is intended freely to communicate with the liquid space from which it draws when there is no flap valve. However, the benefit of a flap valve 33' may be secured to take care of the rebound by having this flap valve cover a portion only of the opening to and from the conduit.

In Figure 4 the shell may occupy the position of the grid, to support the bulb with the inlet of the conduit the only part having grid bars 45'.

Differential throttling of the liquid passage through the perforation 18' or 18² may be arranged by a flap valve 33² which provides predetermined throttling or limitation of flow through the bulkhead from the upper air chamber but permits much quicker flow of liquid in an upward direction than when the air in the upper air chamber is expanding.

In Figures 5 and 6 the supporting structure for the air bulb need not be a closed cylinder but is a mere bracket or group of brackets 47, secured to the bulkhead in Figure 5 and, upside down as compared with this, to the bottom in Figure 6.

While the seal between the bowl flange and the cover or diaphragm flange must be hydraulically tight, so that there will be no leakage, the other connections have mechanical requirements of strength but do not require to be liquid-tight. The orifices may be partially closed by flap valves closing part of the valve (or with several orifices, all of one or more orifices) to take care of rebound, if such care be desired, in each of Figures 4, 5, 6, 7 and 8.

In Figures 2 and 4, where a flap valve is used the flap valve 33' may partially overlap the position of the pin (i. e., extend from one side not only to or nearly to the largest diameter of pin which will enter the orifice, but extend along opposite sides of the pin).

The opportunity to select bulbs which are flexible merely or are also stretchable and recover quickly is present in all of the air units shown which are or form parts of hydraulic accumulators and are used for support of the bulbs either by the grid or shell against excessive stress or by the limitation against excessive movement toward the bowl which exists in all of them.

In Figure 6 as a matter of illustration only of what is permissible from the standpoint that it will work, but not desirable because of excessive amount of liquid which it necessitates, the unit corresponding to the air unit in Figure 5 is placed in the bottom of a hollow piston.

The placing of this air unit in the bottom requires that the piston as well as part of the cylinder be filled with liquid, objectionably increasing weight as well as requiring additional liquid.

Not only is the bulkhead perforated and its orifice 18³ permissibly flap-valved, but the upper end of the piston in this figure is apertured at 32'. One or more of the openings are wholly or partially closed from below by flap valve 33 which take care of the rebound by shutting off return flow of liquid through all or through a selected proportion of each of the areas of the apertures.

No pin is used and any desired amount of constriction of the upward flow through the perforation 18³ may be provided so as to use the air cell differentially, giving a lower rate of constriction during compression of the air than during expansion of the air of this cell. Both air chambers may thus be protected with respect to rebound.

In the structure of Figure 4, air may be introduced into the air cell through a check valve 42'. Similarly in Figures 5, 6, 7 and 8 check valves 42 and pipes 43 may be used for a similar purpose.

In Figure 7 an upper hydraulic accumulator air cell 21² is shown with a guard or grid 39' adapted to restrain excessive movement due to internal pressure of the cover or diaphragm 37². The liquid compresses air within an accumulator cell 21². Initial pressure may be increased by forcing air in through check valve 42 and pipe 43'. There is no separate bowl. The liquid occupies the space at 48 and enters and leaves the apertures 32⁴.

The piston at its upper end at 49 terminates in a head which is apertured at 32⁴, 32⁵ of which some apertures are unrestricted in both directions and others in one direction to eliminate excessive rebound; and some of the grid opening may be restricted by flaps 33' in opening movement.

A floating piston 50 lies within the upper portion of the hollow telescopic piston and is moved by the liquid under pressure against increasing air resistance. It is returned by expanding air under it.

Downward movement of the floating piston compresses air within the space 51 increasing pressure from any desired initial pressure as determined by insertion of air to the space 51 through a check valve 54. The usual landing tire is intended to be used.

In Figure 8 the cylinder and piston in telescopic movement compress—or allow to expand—air in one chamber only and that in an elongated air cell 52 restrained against excessive expansion under pressure by a grid 53 and filled with air through a check valve connection 54. The grid and air cell lie wholly within the piston and are surrounded by liquid which has free access to them during compressive movement of the piston with respect to the cylinder through apertures 32⁴, 32⁵; but in order to control the rebound some of the apertures typified by these are one way openings only and are closed by flaps 33⁴ so as to restrict rebound movement. Here also a bracket carries the air unit and a landing wheel is intended to be used.

In operation, when the tire strikes, telescoping of the cylinder over the piston begins. Immediately, two cushioning actions start, each assisting in smoothing out the curve of impact, relieving the jar; and the two together result in the plane coming to rest on the tires. One, passing liquid through a throttling opening against air under increasing pressure, is designed primarily to dissipate energy but nevertheless acts as a cushion and slowly yields to pressure, resulting in telescopic movement. The other, the hydraulic accumulator, through free compressive access of liquid to its air cell on the high pressure side of the throttling point, gives a soft and more quickly responsive cushion which acts to take up the flutter due to roughnesses in the surface of the field, either upon landing or on taxiing over the field. It reacts to the same high pressure of liquid within the leg as that of the liquid which passes through the orifice but in its action much more nearly resembles the landing tire, than it does the fluid-throttling, energy-dissipating action of the other form. The air cell preferably has an initial pressure of, let us say, two or three hundred pounds. If under initial pressure it is protected against excessive expansion.

In effect, considered just as cushions, the liquid-and-air cushion is split up into upper and lower air cushions with a slug of liquid between, which is damped in its progress in its energy-dissipating movement which results in compressing the upper air cushion, and is free from damping in its compression of the lower air cushion although both are preferably damped in rebound. Each acts as an abutment against which the liquid presses to exert the liquid's pressure against the other.

The tire acts very well, momentarily, until its small range of total compression and increase in resistance is taken up. The quick reaction of the accumulator divides the contraction and expansion with the tire and, consequently, when there is a partial relief from pressure, the accumulator tends to make the tire follow the ground more closely than would otherwise be the case. For this reason the initial compression of the air cell is preferably less than the compression occurring in the tire with the airplane standing, considering the proportion of the relative cross-sectional areas.

The hydraulic accumulator acts spontaneously and almost instantaneously in series with the tire, getting its thrust free from restriction due to constricted orifices.

It will be noted that the hydraulic accumulator acts much like a tire but with a control of rebound which a tire does not have. The accumulator cushion does not in any way affect the energy-dissipating action of the throttled liquid flow except as it allows a cushioning action preliminary to such cushioning as inevitably takes place during liquid flow. It tends to equalize the pressure upon the liquid and makes more uniform the extent of flow through the orifices.

It will be evident that the diaphragm of most of the forms, separating the liquid under pressure from the air of the hydraulic accumulator air cell is just as much a movable air cell wall as is the piston 50 in the form of Figure 7 and that in each case the air cell wall is accessible freely to the liquid on the pressure side of the bulkhead.

In Figure 9 is shown another form of metering pin leg intended to rest upon a pneumatic tire wheel and to connect with the body of an airplane.

In this form the plunger 55 telescopes into an outer shell 56 which in its upper end is intended to contain liquid 16 and an air cell 57 of an hydraulic accumulator. A guard 58 for the collapsible part of the cell is fastened in the upper part of the shell and supports a downwardly directed metering pin 59. The guard is apertured to allow free access of liquid while preventing extrusion of the cell material when the cell is under initial pressure.

With closing telescopic movement of the parts the liquid 16 is under pressure and brings pressure against the surface of the air cell.

The liquid under pressure is squeezed downwardly now instead of upwardly as compared with Figure 2, and passes through a throttling opening 18 closed to different extents according to the position of the tapered pin.

As thus described the operation is very similar to the operation in Figure 2. However, the liquid which passes through the throttling opening 18 passes downwardly through a tube 60 rigid with and sealing against the under face of the piston 61. The liquid passes into the lower part of the plunger at 62 where it spreads outwardly and upwardly, following the arrows 63 and brings pressure upon a piston 64.

The piston is annular. It seals internally against the exterior of the tube and externally against the interior of the plunger, with the effect that during telescopic closing of the parts and consequent upward movement of the piston in Figure 9, air is compressed within an annular cushion chamber 65 surrounding the tube 60. This chamber is closed at the top by the plunger head 66, at the outsides by the interior surface of the plunger and at the bottom by the upper surface of the piston.

Downward movement of the piston can be stopped by a collar 67, preferably but not necessarily high enough for the piston always to seal at the inside against the tube.

Pressure can be applied initially to the cell 20 through pipe 43' guarded by a check valve 42.

Air under pressure can be forced into chamber 65 as by a flexible pipe 68 guarded by a check valve. If it be desired to permit release of this pressure the check valve is placed at 42', outside the casing but if it be intended to trap a standard pressure within the plunger the valve may be a flap valve 69 and the only form of deliberate release available is by withdrawal of the plunger from the shell, and unscrewing the upper part of the plunger from its base at 70.

The tubing feeding the air cushion 65 may or may not be armoured tubing according to the pressures which are contemplated and the size and character of the tubing, but if a thin flexible tubing it should at least be spiralled with wire to maintain it against binding and keep its coils spaced from each other.

The upper part of the space for liquid surrounding the metering pin may also be used as an air cushion, supplying the air to it through pipe 43$^2$ checked by valve 42'.

In operation the form of Figure 9 is very much like the form in Figure 2. With collapsible parts the liquid immediately under pressure has free access to the diaphragm of the upper cushion (the accumulator air cell) and restricted access, through the progressively more restricted opening, down through the tube to the piston in the plunger.

Air may accumulate below the piston but if it appear in any quantity it may be pushed down by the piston and allowed to rise through the tube. This air will act in much the same way as air compressed in the space 65 surrounding the tube but above the piston, so that it makes practically no difference whether this air be there or not.

Having thus described my invention what I claim as new and desire to secure by Letters Patent is:

1. In an oleo strut, a pair of telescopic members arranged one above the other, the lower member having an apertured upper end and a compartment beneath the apertures in the upper end, an apertured bulkhead in the upper member, liquid in the lower member adapted to be forced through the apertured bulkhead by closing telescoping movement of the members and trapping air above the bulkhead, one-way valve mechanism providing free passage of liquid into said compartment and less free passage from it and an hydraulic accumulator air cell located in said compartment.

2. In an oleo strut, upper and lower telescopic strut members, liquid in the upper strut member, an air cushion in the upper part of the upper member compressed by the liquid, an air container within the lower member, comprising a second cushion, filling means for placing the air under pressure, whereby with closing movement of the telescopic members both air cushions are compressed on the compression stroke from a predetermined initial pressure, one freely and the other subject to the limitations of a restricting orifice, and with opening movement of the telescopic members the pressure upon each of the cushions is reduced.

3. In an oleo strut, upper and lower telescoping members of which the lower member is the plunger, liquid in the strut, an hydraulic air cell in the upper member above the highest position to which the plunger is intended to reach, and to which liquid in the strut has free access when the strut is closing, an opening within the plunger, a metering pin converging downwardly passing through the opening, a tube surrounding the pin and passing down to the lower part of the plunger and a piston movable within the plunger and about the tube, urged upwardly by liquid passing through the tube and walls forming a closed air space above the piston.

MILTON R. MULLEN.

REFERENCES CITED

The following references are of record in the file of this patent:

UNITED STATES PATENTS

| Number | Name | Date |
|---|---|---|
| 1,291,016 | Kellogg | Jan. 14, 1919 |
| 1,328,496 | Cox | Jan. 20, 1920 |
| 1,855,064 | Messier | Apr. 19, 1932 |
| 1,956,669 | Charles | May 1, 1934 |
| 1,967,641 | Wallace | July 24, 1934 |
| 2,106,198 | Williams | Jan. 25, 1938 |
| 2,165,465 | Ehrhardt et al | July 11, 1939 |
| 2,196,089 | Wallace | Apr. 2, 1940 |
| 2,216,374 | Martin | Oct. 1, 1940 |
| 2,263,710 | Wallace | Nov. 25, 1941 |

FOREIGN PATENTS

| Number | Country | Date |
|---|---|---|
| 523,283 | Great Britain | July 10, 1940 |
| 845,721 | France | May 22, 1939 |